(12) United States Patent
Carnevali et al.

(10) Patent No.: US 11,832,712 B2
(45) Date of Patent: Dec. 5, 2023

(54) STAND AND STRETCHABLE BRIDLE FOR TABLETS AND HANDHELD ELECTRONIC DEVICES

(71) Applicant: National Products, Inc., Seattle, WA (US)

(72) Inventors: Jeffrey D. Carnevali, Seattle, WA (US); Rick Phillips, Bothell, WA (US)

(73) Assignee: National Products, Inc., Seattle, WA (US)

( * ) Notice: Subject to any disclaimer, the term of this patent is extended or adjusted under 35 U.S.C. 154(b) by 61 days.

(21) Appl. No.: 17/476,091

(22) Filed: Sep. 15, 2021

(65) Prior Publication Data

US 2023/0105321 A1 Apr. 6, 2023

(51) Int. Cl.
*A45F 5/00* (2006.01)
*F16M 11/20* (2006.01)
*F16M 11/38* (2006.01)

(52) U.S. Cl.
CPC ........... *A45F 5/00* (2013.01); *F16M 11/2021* (2013.01); *F16M 11/38* (2013.01); *A45F 2005/008* (2013.01); *A45F 2200/0516* (2013.01); *A45F 2200/0525* (2013.01)

(58) Field of Classification Search
CPC ........ A45F 2005/008; A45F 2200/0525; A45F 5/00; A45F 2200/0516; F16M 11/2021; F16M 11/38
USPC ..................................................... 248/176.3
See application file for complete search history.

(56) References Cited

U.S. PATENT DOCUMENTS

| | | | |
|---|---|---|---|
| 7,594,631 B1 * | 9/2009 | Carnevali | B60R 11/0241 248/289.11 |
| D650,531 S * | 12/2011 | Young | D29/120.1 |
| 8,070,026 B2 | 12/2011 | Wadsworth et al. | |
| 8,120,896 B2 * | 2/2012 | Mori | A45F 5/00 190/110 |
| 8,235,334 B1 * | 8/2012 | Kobal | F16M 11/38 248/346.07 |

(Continued)

FOREIGN PATENT DOCUMENTS

| | | | | |
|---|---|---|---|---|
| DE | 202014102396 U1 * | 7/2014 | | B62J 11/00 |
| JP | 3361326 B1 * | 1/2003 | | B62J 11/00 |

(Continued)

*Primary Examiner* — Taylor Morris
(74) *Attorney, Agent, or Firm* — Branch Partners PLLC; Bruce E. Black

(57) ABSTRACT

An attachable stand arrangement for a portable electronic device includes a stretchable bridle having a base attachment portion and straps extending from the base attachment portion and configured to stretch and fit over at least two corners of the portable electronic device. The attachable stand arrangement also includes a stand assembly having a base attached to the base attachment portion of the stretchable bridle, a rotatable support attached to, and rotatable relative to, the base, and a deployable stand attached to the rotatable support and pivotable with respect to the base between a stowed position and deployed positions and configured, when a portable electronic device is received by the attachable stand arrangement and the deployable stand is pivoted away from the base to at least one of the deployed positions, to support the portable electronic device on an external surface in an angled arrangement relative to the external surface.

20 Claims, 4 Drawing Sheets

(56) References Cited

U.S. PATENT DOCUMENTS

| | | | |
|---|---|---|---|
| 8,382,059 B2* | 2/2013 | Le Gette | F16M 11/105 |
| | | | 248/463 |
| 8,616,423 B2* | 12/2013 | Wizikowski | A45F 5/00 |
| | | | 224/267 |
| 8,662,362 B1 | 3/2014 | Bastian et al. | |
| 8,740,270 B1* | 6/2014 | Mizell | A45F 5/00 |
| | | | 224/217 |
| 8,827,234 B2* | 9/2014 | Baker | F16M 13/00 |
| | | | 248/682 |
| 9,062,811 B2* | 6/2015 | Yu | H05K 7/18 |
| 9,074,725 B2* | 7/2015 | Trotsky | F16M 11/105 |
| 9,133,982 B1* | 9/2015 | Valdez | F16M 13/022 |
| 9,219,516 B2* | 12/2015 | Haymond | B65D 25/00 |
| D756,366 S | 5/2016 | Floersch et al. | |
| 9,407,743 B1* | 8/2016 | Hirshberg | H04B 1/385 |
| 9,971,232 B2* | 5/2018 | Jeong | G03B 17/563 |
| D871,754 S* | 1/2020 | Feng | F16M 13/00 |
| | | | D3/218 |
| 10,595,622 B2 | 3/2020 | Carnevali | |
| 10,617,198 B1* | 4/2020 | De Michele | A45F 5/00 |
| D892,491 S* | 8/2020 | Feng | A45F 5/00 |
| | | | D3/201 |
| 11,071,364 B1* | 7/2021 | Fowler | A45C 13/30 |
| 2011/0279959 A1* | 11/2011 | Lopez | A45F 5/00 |
| | | | 361/679.03 |
| 2012/0024917 A1* | 2/2012 | Case | A45F 5/00 |
| | | | 224/259 |
| 2012/0025684 A1 | 2/2012 | Trotsky | |
| 2012/0111881 A1 | 5/2012 | Gaddis, II et al. | |
| 2013/0001382 A1 | 1/2013 | Jang | |
| 2013/0009032 A1* | 1/2013 | Polletta | F16M 13/00 |
| | | | 248/440.1 |
| 2013/0254976 A1 | 10/2013 | Aravena | |
| 2013/0299365 A1 | 11/2013 | Andrew | |
| 2013/0300141 A1 | 11/2013 | Byrne | |
| 2014/0077515 A1 | 3/2014 | Rasmussen et al. | |
| 2014/0252786 A1* | 9/2014 | Singhal | H04B 1/3888 |
| | | | 294/137 |
| 2014/0312090 A1* | 10/2014 | Garza, Jr. | H04M 1/05 |
| | | | 224/660 |
| 2015/0041622 A1* | 2/2015 | Mulhern | F16M 13/00 |
| | | | 248/688 |
| 2015/0175081 A1* | 6/2015 | Rodriguez | A45F 3/02 |
| | | | 224/275 |
| 2015/0288406 A1* | 10/2015 | Haymond | H04B 1/3888 |
| | | | 455/575.8 |
| 2017/0120980 A1* | 5/2017 | Karl | B62J 11/00 |
| 2019/0298047 A1* | 10/2019 | Vanettes | A45F 5/00 |
| 2021/0085064 A1* | 3/2021 | Khalsa | H04M 1/04 |
| 2021/0100342 A1* | 4/2021 | Colorado | A45F 5/00 |
| 2021/0127816 A1* | 5/2021 | Sirichai | A45F 5/00 |
| 2021/0227960 A1 | 7/2021 | Carnevali | |
| 2021/0298463 A1* | 9/2021 | Lin | A45F 5/00 |
| 2021/0328394 A1* | 10/2021 | Carnevali | H04M 1/724092 |
| 2021/0351808 A1* | 11/2021 | Lin | A45C 11/00 |

FOREIGN PATENT DOCUMENTS

| | | | | |
|---|---|---|---|---|
| JP | 2009205531 A | * | 9/2009 | A45F 3/14 |
| WO | 2012/087371 | | 6/2012 | |

* cited by examiner

STAND AND STRETCHABLE BRIDLE FOR TABLETS AND HANDHELD ELECTRONIC DEVICES

FIELD OF THE INVENTION

The present invention relates generally to an attachable stand arrangement for a portable electronic device, and in particular to a combination stand and stretchable bridle for both tablets and other handheld portable electronic devices.

BACKGROUND OF THE INVENTION

Handheld portable electronic devices are generally well-known. Some electronic devices, such as tablets and cellular telephones, are able to rotate their display between a portrait view and landscape view. These and other portable electronic devices are often mounted in a protective case, some cases have arm or wrist bands that allow the electronic device to be carried on the user's arm for convenience and easy access. Stands are also known for supporting the electronic device on an external fixed surface, such as a desk or tabletop, or an automobile windscreen or dashboard.

SUMMARY OF THE INVENTION

One embodiment is an attachable stand arrangement for a portable electronic device. The attachable stand arrangement includes a stretchable bridle having a base attachment portion and straps extending from the base attachment portion and configured to stretch and fit over at least two corners of the portable electronic device to removably receive, and attach to, the portable electronic device. The attachable stand arrangement also includes a stand assembly having a base attached to the base attachment portion of the stretchable bridle, a rotatable support attached to, and rotatable relative to, the base, and a deployable stand attached to the rotatable support and pivotable with respect to the base between a stowed position and deployed positions and configured, when a portable electronic device is received by the attachable stand arrangement and the deployable stand is pivoted away from the base to at least one of the deployed positions, to support the portable electronic device on an external surface in an angled arrangement relative to the external surface.

In at least some embodiments, the stand assembly further includes a hand strap attached to the rotatable support. In at least some embodiments, the attachable stand arrangement further includes at least one magnet disposed in or on the hand strap.

In at least some embodiments, the stretchable bridle includes at least four of the straps. In at least some embodiments, the straps are configured to fit over four corners of the portable electronic device.

In at least some embodiments, the stretchable bridle further includes at least one strap support coupled to the base attachment portion and at least one of the straps. In at least some embodiments, the stretchable bridle includes at least two of the strap supports and at least four of the straps with each of the strap supports coupled to at least two of the straps.

In at least some embodiments, the base of the stand assembly includes a plurality of coupling extensions and the base attachment portion of the stretchable bridle includes a plurality of coupling openings configured to receive the coupling extensions to couple the base to the base attachment portion. In at least some embodiments, the stretchable bridle is made of rubber (for example, natural rubber, ethylene propylene diene monomer (EPDM) rubber, thermoplastic rubber (TPR), nitrile rubber, neoprene, butadiene rubber, styrene-butadiene rubber, or any other suitable rubber), silicone, thermoplastic polyurethane, or elastomeric fabric or the like or any combination thereof.

Another embodiment is an attachable stand arrangement for a portable electronic device. The attachable stand arrangement includes a stretchable bridle including a base attachment portion and straps extending from the base attachment portion and configured to stretch and fit over at least two corners of the portable electronic device to removably receive, and attach to, the portable electronic device. The attachable stand arrangement also includes a stand assembly including a base attached to the base attachment portion of the stretchable bridle, a hand strap coupled to the base, and a deployable stand coupled to, and pivotable with respect to, the base between a stowed position and a plurality of deployed positions and configured, when a portable electronic device is received by the attachable stand arrangement and the deployable stand is pivoted away from the base to at least one of the deployed positions, to support the portable electronic device on an external surface in an angled arrangement relative to the external surface.

In at least some embodiments, the attachable stand arrangement further includes at least one magnet disposed in or on the hand strap. In at least some embodiments, the stretchable bridle includes at least four of the straps.

In at least some embodiments, the stretchable bridle further includes at least one strap support coupled to the base attachment portion and at least one of the straps. In at least some embodiments, the stretchable bridle includes at least two of the strap supports and at least four of the straps with each of the strap supports coupled to at least two of the straps.

Yet another embodiment is a method of using any of the portable stand arrangements described above. The method includes pulling the straps of the stretchable bridle of the portable stand arrangement over at least two corners of the portable electronic device; pivoting the deployable stand to at least one of the deployed positions; and setting the portable electronic device and attachable stand arrangement on a surface in an angled arrangement.

In at least some embodiments, the method further includes pivoting the deployable stand to the stowed position. In at least some embodiments, the stand assembly of the attachable stand arrangement further includes a hand strap, the method further including attaching the hand strap to a user's hand.

In at least some embodiments, the attachable stand arrangement further includes at least one magnet disposed in or on the hand strap, the method further including attaching the portable electronic device and attachable stand arrangement to a surface using the at least one magnet. In at least some embodiments, pulling the straps includes pulling the straps of the stretchable bridle of the portable stand arrangement over at least four corners of the portable electronic device. In at least some embodiments, the method further includes removing the straps from the at least two corners of the portable electronic device to remove the portable stand arrangement from the portable electronic device.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF PREFERRED EMBODIMENT

The present invention relates generally to an attachable stand arrangement for a portable electronic device, and in particular to a combination stand and stretchable bridle for both tablets and other handheld portable electronic devices.

Figure 1A:
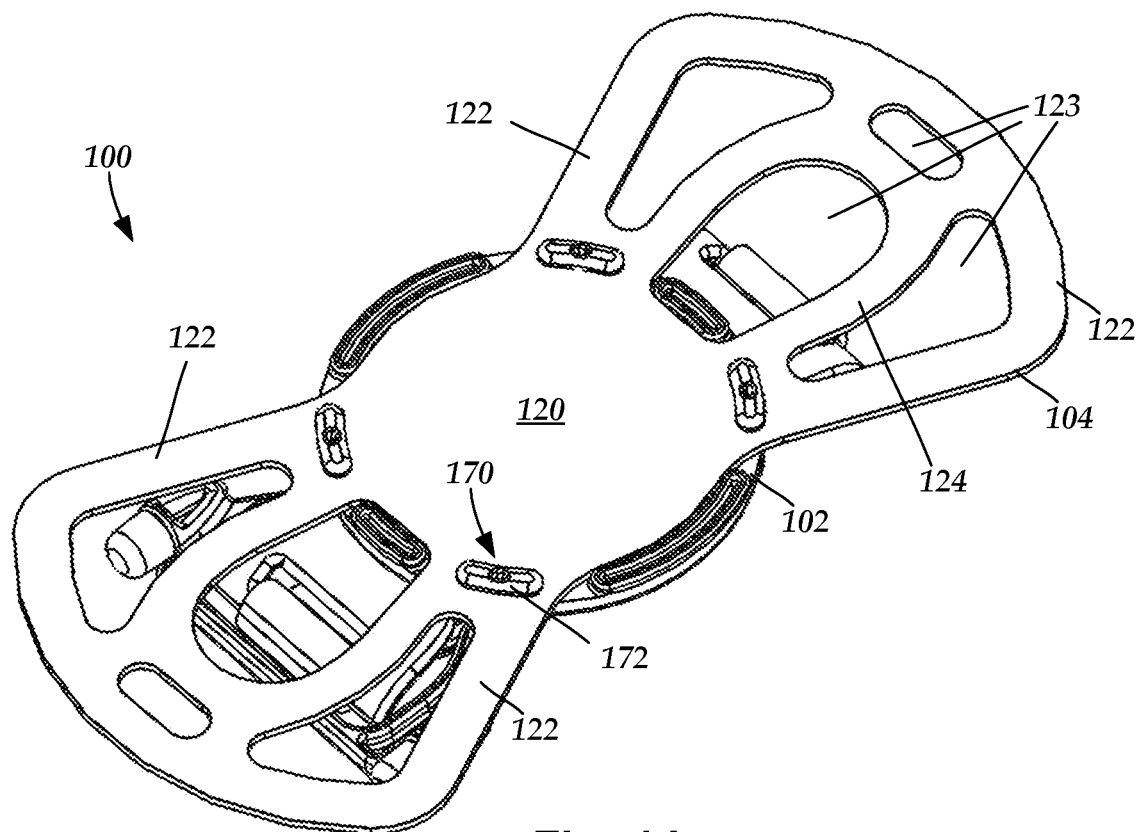
FIG. 1A is a front view of one embodiment of an attachable stand arrangement, according to the invention.
Figure 1B:
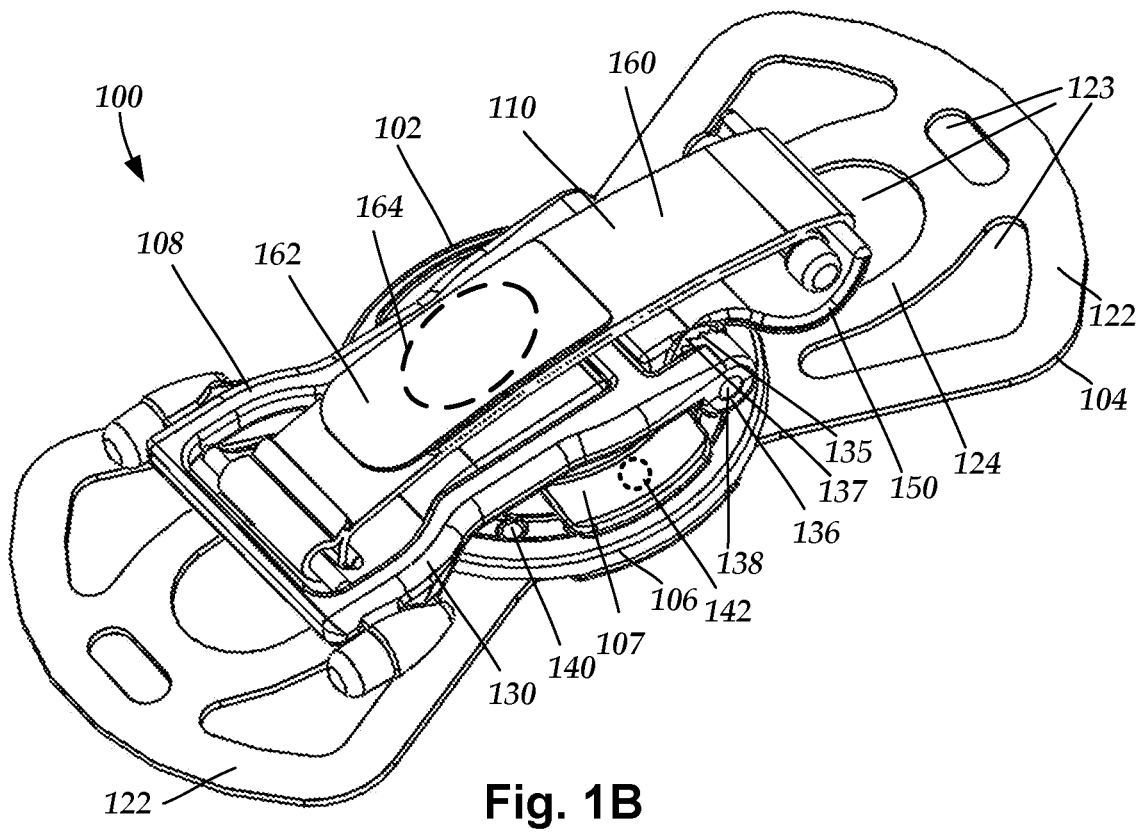
FIG. 1B is a back view of the attachable stand arrangement of FIG. 1A, according to the invention.
Figure 1C:
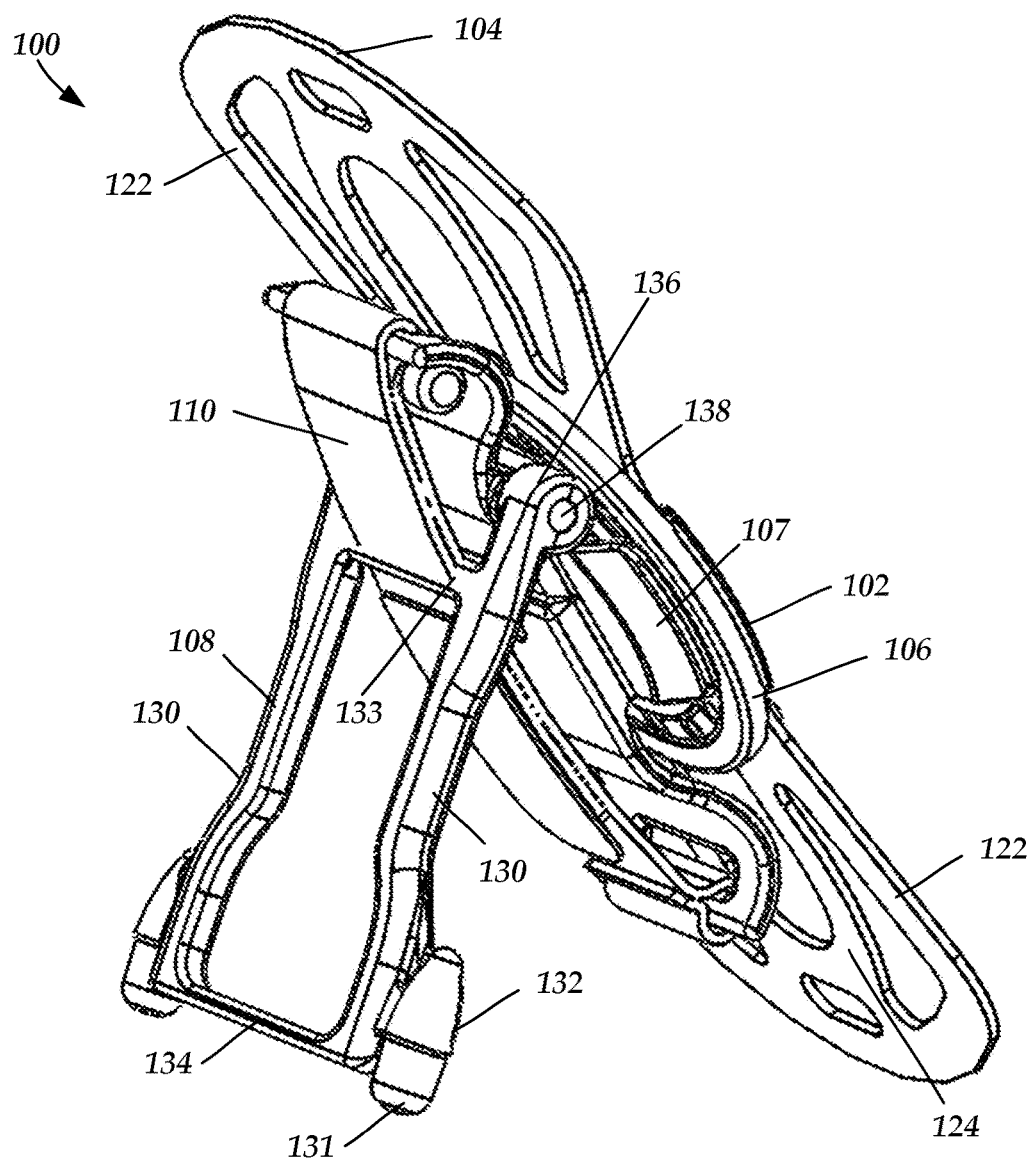
FIG. 1C is a perspective view of the attachable stand arrangement of FIG. 1A with a stand deployed, according to the invention.

FIGS. 1A and 1B are front and back views of one embodiment of an attachable stand arrangement 100 that includes a stand assembly 102 and a stretchable bridle 104 that can fit onto a tablet or other handheld portable electronic device. The stand assembly 102 includes a base 106 attached to the stretchable bridle 104, an optional rotatable support 107 rotatably attached to the base, and a deployable stand 108 attached to the rotatable support or the base. The deployable stand 108 can be in a stowed (or stored) position, as illustrated in FIGS. 1A and 1B, or in one of multiple deployed positions, as illustrated in FIG. 1C. In at least some embodiments, the stand assembly 102 also includes a hand strap 110 attached to the rotatable support 107 or the base 106.

FIGS. 2A to 2E illustrate the stand assembly 102 and stretchable bridle 104 attached to a portable electronic device 112, such a tablet, laptop, mobile phone, or other handheld electronic device. The portable electronic device 112 includes a body 114 with a display screen 116 on the front side of the body. The portable electronic device 112 may or may not include a case or skin disposed over at least a portion of the body 114.

Returning to FIGS. 1A to 1C, the stretchable bridle 104 includes a base attachment portion 120, multiple straps 122 extending from the base attachment portion, and, optionally, one or more strap supports 124. Each of the strap supports 124 is attached to the base attachment portion and one or more of the straps. The stretchable bridle 104 is made of any suitable elastomeric or stretchable material including, but not limited to, rubber (for example, natural rubber, ethylene propylene diene monomer (EPDM) rubber, thermoplastic rubber (TPR), nitrile rubber, neoprene, butadiene rubber, styrene-butadiene rubber, or any other suitable rubber), silicone, thermoplastic polyurethane, or elastomeric fabric or the like or any combination thereof. The stretchable bridle 104 may include one or more openings 123 between the straps 122 and strap support(s) 124, or within the strap support(s), to facilitate flexibility and stretchability.

The stretchable bridle 104 can be sized (for example, by selection of one or more of the size of the base attachment portion 120, the length of the straps 122, the length of the strap support(s) 124, or any combination thereof) to fit a particular size or range of sizes of portable electronic devices 112. Due to its elastomeric or stretchable nature, the stretchable bridle 104 may be sized to fit portable electronic devices 112 of similar size (for example, different in length or width (or both) by 1, 2, 3, 4, or 5 centimeters or more or 5 or 10% or more). Such an arrangement can result in a stretchable bridle 104 and stand assembly 102 that can be used with a range of differently sized portable electronic devices 112 from the same or different manufacturers.

Figure 2A:
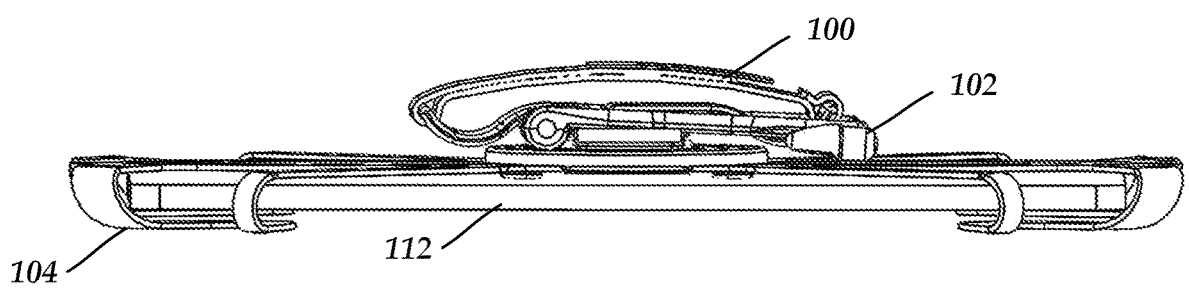
FIG. 2A is a side view of the attachable stand arrangement of FIG. 1A coupled to a portable electronic device, according to the invention.
Figure 2B:
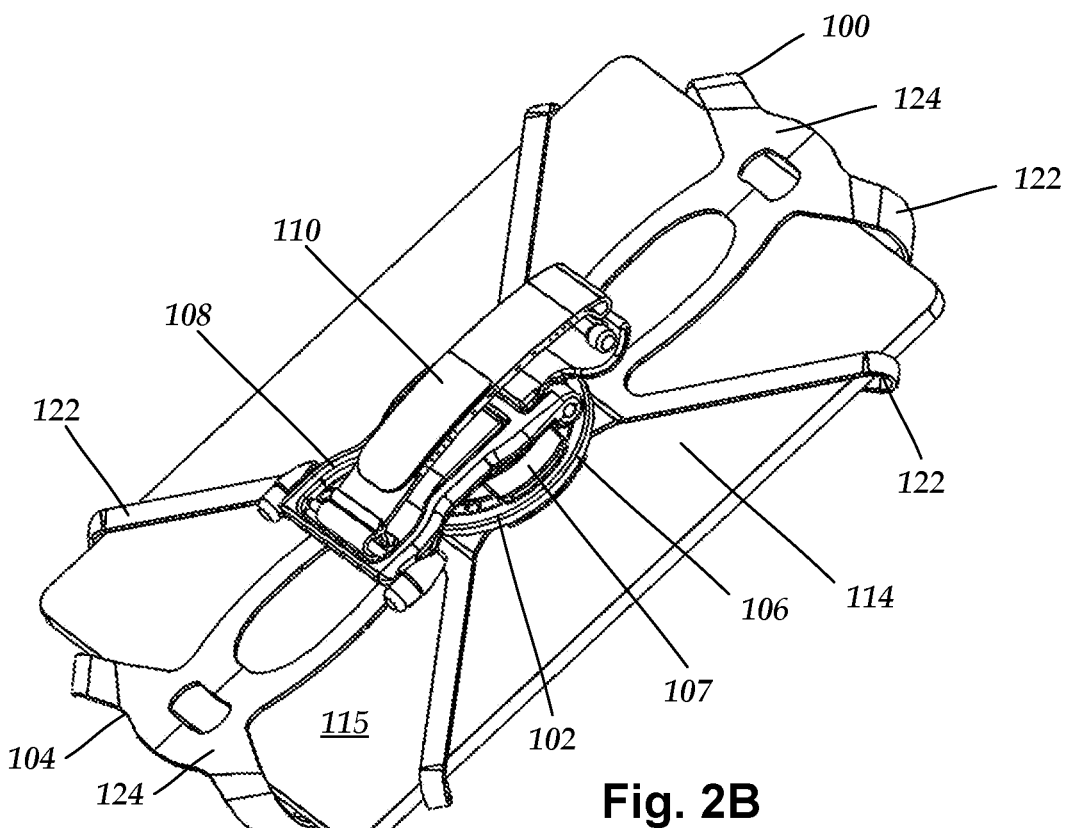
FIG. 2B is a back view of the attachable stand arrangement of FIG. 1A coupled to the portable electronic device, according to the invention.
Figure 2C:
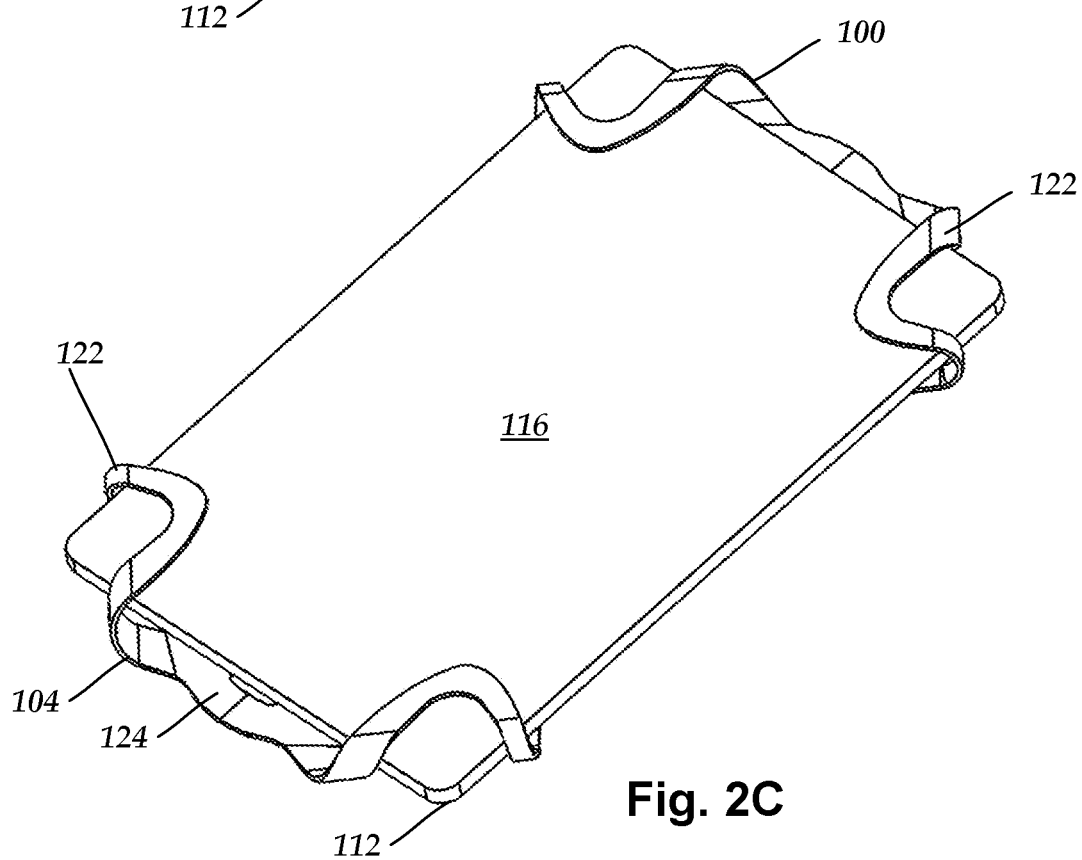
FIG. 2C is a top view of the attachable stand arrangement of FIG. 1A coupled to the portable electronic device, according to the invention.

When attached to the portable electronic device 112, the base 106 of the stand assembly 102 is disposed over a back side 115 (FIG. 2B) of the body 114 of the electronic device. The stretchable bridle 104 can include two, three, four, or more straps 122. In the illustrated embodiment of FIGS. 1A to 2E, the stretchable bridle includes four straps 122 to extend over four corners of the portable electronic device 122 as illustrated in FIGS. 2A and 2B. The illustrated embodiment of FIGS. 1A to 2E also included two strap supports 124 with each strap support attached to two of the straps 122. Other embodiments could include, for example, two straps that extend over two diagonally-opposed corners of the portable electronic device 112.

Any coupling arrangement can be used to attach the base 106 of the stand assembly 102 to the base attachment portion 120 of the stretchable bridle 104. In at least some embodiments, the base attachment portion 120 of the stretchable bridle 104 includes one or more coupling openings 170 (for example, four coupling openings in the illustrated embodiment of FIG. 1A) and the base 106 includes a corresponding number of coupling extensions 172 that fit through the coupling openings and engage a portion of the base attachment portion 120. The coupling extensions 172 are typically larger in surface area (adjacent the base attachment portion 120) than the coupling openings 170. Additionally or alternatively, adhesive can be used to attach the base 106 of the stand assembly 102 to the base attachment portion 120 of the stretchable bridle 104. Any other suitable coupling method can be used.

In at least some embodiments, the stand assembly 102 is the same as the support described in U.S. Pat. No. 10,595, 622 or U.S. Patent Application Publication No. 2021/ 0227960, both of which are incorporated herein by reference in their entireties, except that the protective case is replaced by the base 106. In at least some embodiments, the stand assembly 102 can include any combination of components, elements, or features of the support described in U.S. Pat. No. 10,595,622 or U.S. Patent Application Publication No. 2021/0227960 except for the protective case. In at least some embodiments, one or more features of the protective case of the support of U.S. Pat. No. 10,595,622 or U.S. Patent Application Publication No. 2021/0227960 can be incorporated into the base 106 or other elements of the stand assembly 102.

Figure 2D:
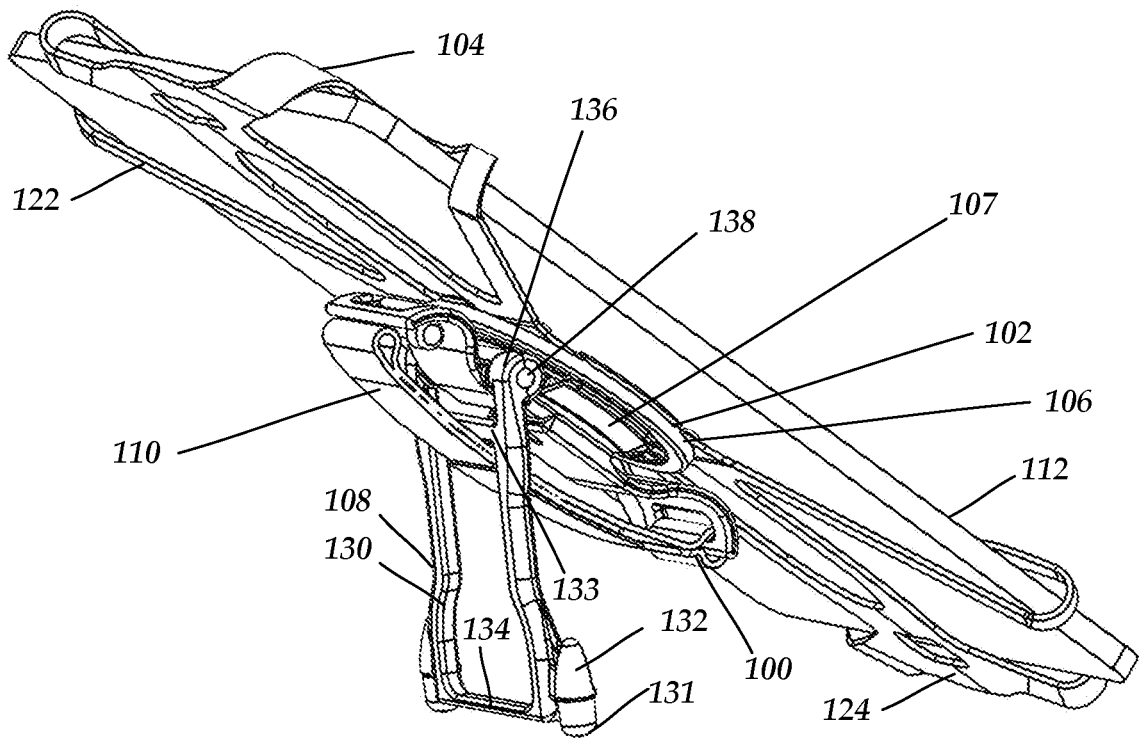
FIG. 2D is a perspective view of the attachable stand arrangement of FIG. 1A with the stand deployed and coupled to the portable electronic device in the portrait orientation, according to the invention.
Figure 2E:
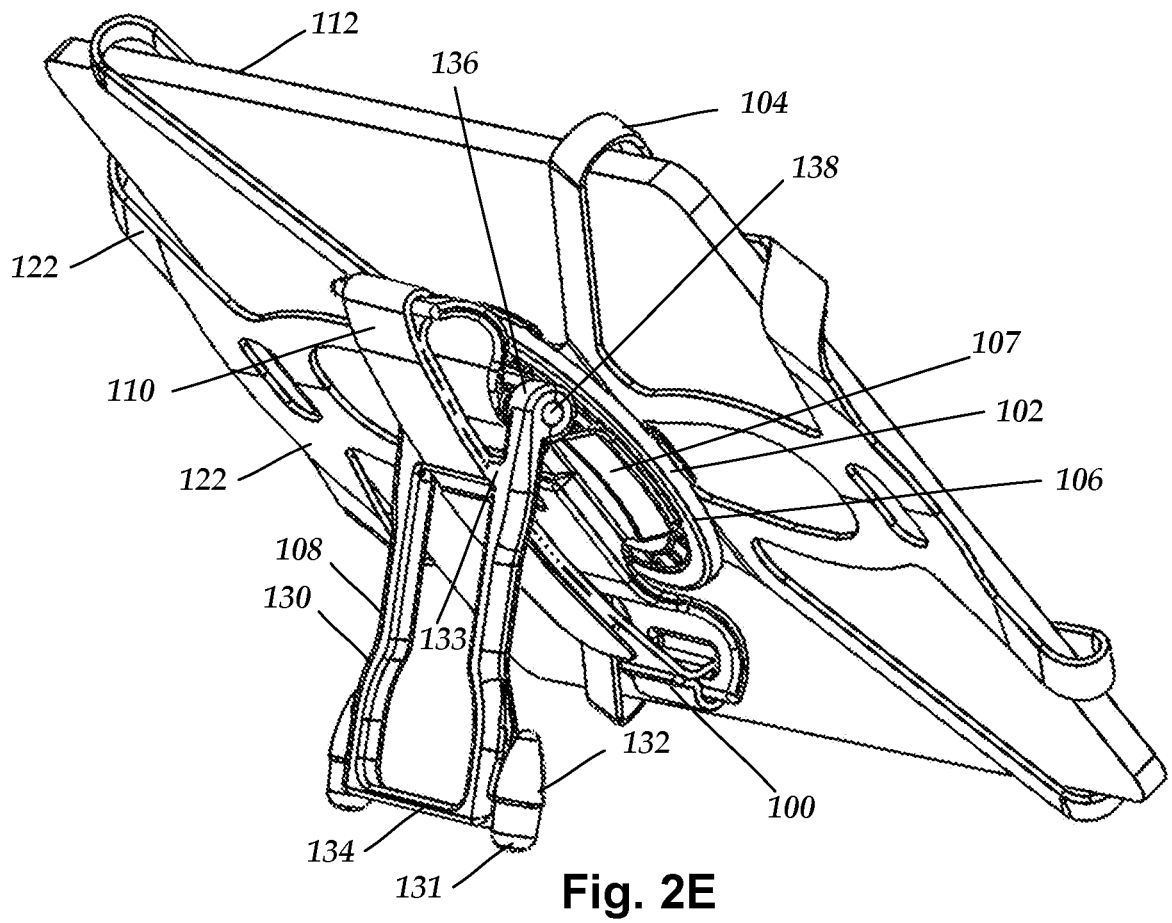
FIG. 2E is a top view of the attachable stand arrangement of FIG. 1A with the stand deployed and coupled to the portable electronic device in the landscape orientation, according to the invention.

The stand 108 can be pivoted, swiveled, or rotated away from a stowed position (for example, FIGS. 1B, 2A, and 2B) against or near the base 106 and stretchable bridle 104 to one more deployed positions (for example, FIGS. 1C, 2D, and 2E). Upon deployment, the stand 108 can support the portable electronic device 112 in an angled arrangement relative to an external surface. In at least some embodiments, the stand 108 is deployable into multiple deployed positions along a range of deployment angles (for example, a range of 0 to 90 degrees or 0 to 180 degrees where 0 degrees is the stowed position) where the deployment angle is defined between the stand 108 and the base 106. The multiple deployed positions permit the stand 108 to support the portable electronic device 112 in different fixed angled arrangements relative to the external surface.

Turning to FIG. 2D for illustration, the stand 108 can include one or more arms 130, and, optionally, one more feet 132 attached to the arm(s). In the illustrated embodiment, the stand 108 includes two arms 130 with a foot 132 attached to each arm and two crossbars 133, 134 extending between the two arms 130. In at least some embodiments, each foot 132 can include a distal portion 131 made of a high-friction or non-skid material, such as rubber or elastomer, that resists sliding of stand 108 on the external surface.

In at least some embodiments, each of the arms 130 includes an attachment end 136 that pivotably attaches to an axle 138 of the rotatable support 107. In at least some embodiments, the attachment end 136 of each of the arms 130 includes teeth 135 (FIG. 1B) to interlockingly engage teeth 137 (FIG. 1B) on the axle 138 to facilitate retention of the stand 108 in individual deployed positions corresponding to the engagements. Examples of such interlocking mechanisms are described in U.S. Pat. No. 10,595,622 and illustrated in at least FIGS. 15 and 16 of that patent. Any other suitable interlocking mechanisms (for example, a ratcheting mechanism) for selection of individual deployed positions can be used. In at least some embodiments, the user can pivot the stand 108 about the axle 138 and select one of the multiple deployed positions by engaging the interlocking mechanism. This interlocking mechanism can also be deactivated or overcome by the user to change to another deployed position or return the stand 108 to the stowed position. For example, the teeth 135 of the two arms 130 can be disengaged from the teeth 137 of the axle 138.

Many portable electronic devices 112, such as tablets and cellular telephones, are able to rotate the information on the display between a portrait view and a landscape view. In at least some embodiments, the attachable stand arrangement 100 accommodates this feature by including a rotatable support 107 that is rotatable relative to the base 106 and stretchable bridle 104. In at least some embodiments, the stand 102 and optional hand strap 110 are attached to the rotatable support 107 so that the stand and optional hand strap can be rotated relative to the base 106, stretchable bridle 104, and portable electronic device 112 allowing the user to use the portable electronic device in portrait orientation, as illustrated in FIG. 2D, or landscape orientation, as illustrated in FIG. 2E (or, in at least some embodiments, one or more orientations between portrait or landscape). Examples of rotational mechanisms are described in U.S. Pat. No. 10,595,622 and illustrated in at least FIGS. 9 to 12 of that patent. Any other suitable rotational mechanism can be used.

In at least some embodiments, as illustrated in FIG. 1B, the base 106 includes multiple indentations 140 or holes and the rotatable support 107 includes one or more pins 142 or other extensions that can removably engage the indentations 140 to hold the rotatable support 107 in a rotational position relative to the base 106. In at least some embodiments, the rotatable support 107 includes two pins 142 disposed opposite each other to engage opposing indentations 140. The pin(s) 142 can be disengaged from the indentation(s) 140 to rotate the rotatable support 107.

In at least some embodiments, the optional hand strap 110 can be made of an elastic material that stretches to accommodate a user's hand. Alternatively, the hand strap 110 can be made of an elastic or inelastic material with two portions that can be joined using Velcro °, buckle, a band, or any other suitable coupling method. In at least some embodiments, the hand strap 110 is attached to a frame 150 that is attached to the rotatable support 107 or base 106. In at least some embodiments, the frame 150 is flexible to allow flexing as the hand strap 110 is attached to the user's hand or during use by the user. In at least some embodiments, the frame 150 is curved and may have a reentrant curve. Examples of hand straps and frames are described in U.S. Pat. No. 10,595,622 and illustrated in at least FIGS. 17 to 19 of that patent.

In at least some embodiments, the hand-strap 110 includes a fabric strap 160 and a plastic or rubber end-piece 162 that can be pulled to tighten the hand-strap 110. The fabric strap 160 can be made of any durable material including, but not limited to, woven webbing material which may be made of polyester, nylon, or other polymeric materials. Within or on the material of the plastic or rubber end-piece 162, at least one magnet 164 is located. There may be two, three, four, or more magnets. The magnet(s) 164 is available to attach to surfaces that are made of a material that is attracted to the magnet(s) so that the attachable stand arrangement 100 with the portable electronic device 112 can be mounted on the surface via the magnet(s). The magnet(s) 164 may be molded or otherwise placed in the plastic or rubber end-piece 162. In at least some embodiments, the entire hand-strap 110 can be made of molded plastic or rubber in place of the fabric strap 160.

In at least some embodiments, the hand strap 110 is made of fabric with at least one magnet 164 within the hand strap 110. There may be two, three, four, or more magnets. For example, the magnet(s) 164 can be sewn or otherwise placed in the hand strap 110.

While the preferred and additional alternative embodiments of the invention have been illustrated and described, it will be appreciated that various changes can be made therein without departing from the spirit and scope of the invention. Therefore, it will be appreciated that various changes can be made therein without departing from the spirit and scope of the invention. Accordingly, the inventor makes the following claims.

What is claimed is:

1. An attachable stand arrangement for a portable electronic device, the attachable stand arrangement comprising:
 a stretchable bridle comprising a base attachment portion and a plurality of straps extending from the base attachment portion and configured to stretch and fit over at least two corners of the portable electronic device to removably receive, and attach to, the portable electronic device, wherein the base attachment portion defines a plurality of coupling openings through the base attachment portion; and
 a stand assembly comprising
  a base comprising a plurality of coupling extensions extending from a remainder of the base, wherein the base is attached to the base attachment portion of the stretchable bridle with the coupling extensions extending through the coupling openings of the base attachment portion, wherein each of the coupling extensions is larger in surface area than a corresponding one of the coupling openings through which the coupling extension extends,
a rotatable support attached to, and rotatable relative to, the base, wherein the base, except for the coupling extensions, is disposed between the rotatable support and the stretchable bridle, and
a deployable stand attached to the rotatable support and pivotable with respect to the base between a stowed position and a plurality of deployed positions and configured, when a portable electronic device is received by the attachable stand arrangement and the deployable stand is pivoted away from the base to at least one of the deployed positions, to support the portable electronic device on an external surface in an angled arrangement relative to the external surface.

2. The attachable stand arrangement of claim 1, wherein the stand assembly further comprises a hand strap attached to the rotatable support.

3. The attachable stand arrangement of claim 2, further comprising at least one magnet disposed in or on the hand strap.

4. The attachable stand arrangement of claim 1, wherein the stretchable bridle comprises at least four of the straps.

5. The attachable stand arrangement of claim 4, wherein the straps are configured to fit over four corners of the portable electronic device.

6. The attachable stand arrangement of claim 1, wherein the stretchable bridle further comprises at least one strap support coupled to the base attachment portion and at least one of the straps.

7. The attachable stand arrangement of claim 6, wherein the stretchable bridle comprises at least two of the strap supports and at least four of the straps with each of the strap supports coupled to at least two of the straps.

8. The attachable stand arrangement of claim 1, wherein the stretchable bridle is made of natural rubber, ethylene propylene diene monomer (EPDM) rubber, thermoplastic rubber (TPR), nitrile rubber, neoprene, butadiene rubber, styrene-butadiene rubber, silicone, thermoplastic polyurethane, or elastomeric fabric or any combination thereof.

9. An attachable stand arrangement for a portable electronic device, the attachable stand arrangement comprising:
a stretchable bridle comprising a base attachment portion and a plurality of straps extending from the base attachment portion and configured to stretch and fit over at least two corners of the portable electronic device to removably receive, and attach to, the portable electronic device, wherein the base attachment portion defines a plurality of coupling openings through the base attachment portion; and
a stand assembly comprising
a base comprising a plurality of coupling extensions extending from a remainder of the base, wherein the base is attached to the base attachment portion of the stretchable bridle with the coupling extensions extending through the coupling openings of the base attachment portion, wherein each of the coupling extensions is larger in surface area than a corresponding one of the coupling openings through which the coupling extension extends,
a hand strap coupled to the base, and
a deployable stand coupled to, and pivotable with respect to, the base between a stowed position and a plurality of deployed positions and configured, when a portable electronic device is received by the attachable stand arrangement and the deployable stand is pivoted away from the base to at least one of the deployed positions, to support the portable electronic device on an external surface in an angled arrangement relative to the external surface, wherein the base, except for the coupling extensions, is disposed between i) the stretchable bridle and ii) the hand strap and deployable stand.

10. The attachable stand arrangement of claim 9, further comprising at least one magnet disposed in or on the hand strap.

11. The attachable stand arrangement of claim 9, wherein the stretchable bridle comprises at least four of the straps.

12. The attachable stand arrangement of claim 9, wherein the stretchable bridle further comprises at least one strap support coupled to the base attachment portion and at least one of the straps.

13. The attachable stand arrangement of claim 12, wherein the stretchable bridle comprises at least two of the strap supports and at least four of the straps with each of the strap supports coupled to at least two of the straps.

14. A method of using the attachable stand arrangement of claim 1, the method comprising:
pulling the straps of the stretchable bridle of the attachable stand arrangement over at least two corners of the portable electronic device;
pivoting the deployable stand to at least one of the deployed positions; and
setting the portable electronic device and attachable stand arrangement on a surface in an angled arrangement.

15. The method of claim 14, further comprising pivoting the deployable stand to the stowed position.

16. The method of claim 14, wherein the stand assembly of the attachable stand arrangement further comprises a hand strap, the method further comprising attaching the hand strap to a user's hand.

17. The method of claim 16, wherein the attachable stand arrangement further comprises at least one magnet disposed in or on the hand strap, the method further comprising attaching the portable electronic device and attachable stand arrangement to a surface using the at least one magnet.

18. The method of claim 14, wherein pulling the straps comprises pulling the straps of the stretchable bridle of the attachable stand arrangement over at least four corners of the portable electronic device.

19. The method of claim 14, further comprising removing the straps from the at least two corners of the portable electronic device to remove the attachable stand arrangement from the portable electronic device.

20. A method of using the attachable stand arrangement of claim 9, the method comprising:
pulling the straps of the stretchable bridle of the attachable stand arrangement over at least two corners of the portable electronic device;
pivoting the deployable stand to at least one of the deployed positions; and
setting the portable electronic device and attachable stand arrangement on a surface in an angled arrangement.

* * * * *